Sept. 5, 1961  G. J. CYPSER ET AL  2,999,237
FLIGHT INDICATORS

Filed Feb. 29, 1960  2 Sheets-Sheet 1

INVENTORS
GUSTAV J. CYPSER
EDWARD R. DAYTON
BY
ATTORNEY

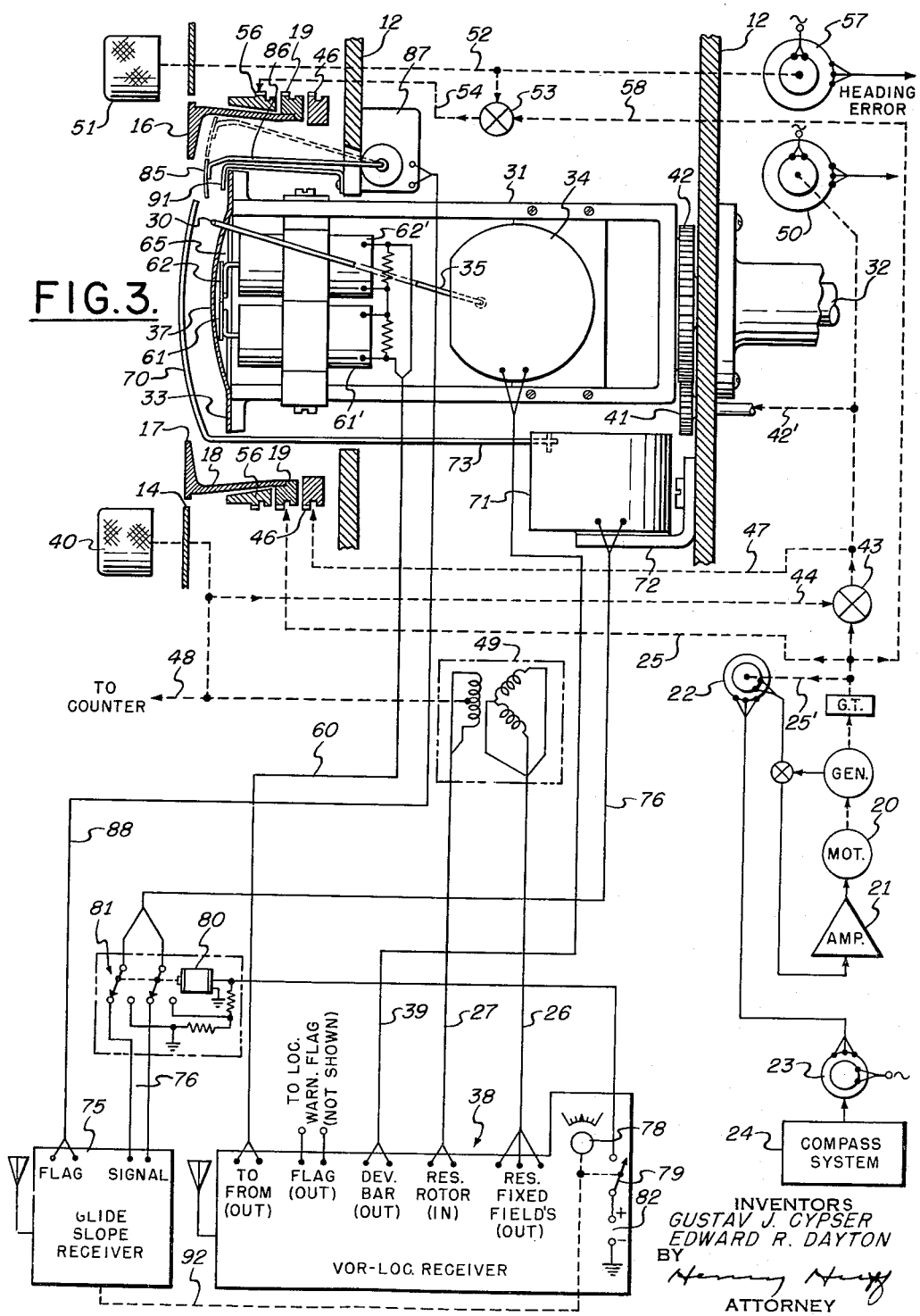

end of the bar thereby forming a pointer which points to the reciprocal of the selected bearing on the compass card. Therefore, inasmuch as the to-from arrowheads are heading stabilized and lie closely adjacent the inner periphery of the circular indicator opening, there should be no obstruction which would obscure the arrowheads as they move with the compass card during turning of the aircraft, especially during VOR and initial LOC operation. In order to provide this unobstructed opening during such azimuth guidance, the glide slope reference scale above referred to is removed from the viewing opening when no vertical guidance is selected.

It is therefore another object of the present invention to provide an azimuth and vertical guidance indicator having azimuthal direction defining means or arrowheads lying closely adjacent the periphery of the instrument opening and which move around such opening in accordance with the heading of the aircraft and wherein, for vertical guidance, a horizontal or glide slope bar and cooperating vertical scale are provided, both of which are removed from view when not in use whereby not to obstruct the pilot's view of said azimuthal direction indicators.

Other objects and advantages of the present invention will become clearly apparent as a description of a preferred embodiment of the invention proceeds, reference being made to the accompanying drawings wherein:

FIG. 3 is a partial horizontal section taken generally on line 3—3 of FIG. 1 and including a schematic diagram of the electric and mechanical connections which operate the various indicating elements of the instrument.

Figure 1:
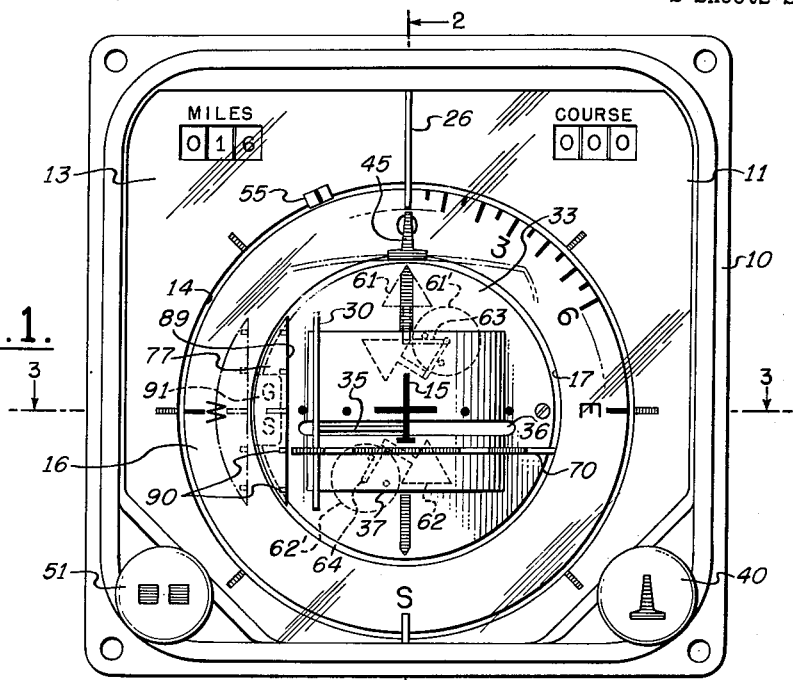
FIG. 1 is a front elevation view of the instrument as seen by the pilot.

Referring now to the drawings, the navigation instrument of the present invention comprises generally an instrument housing 10 having an opening in the front end thereof preferably covered with a glass window 11 to protect the interior thereof from foreign matter. The entire housing may, of course, be hermetically sealed. The electrical and mechanical components of the instrument are supported on a plurality of spaced partitions or walls 12 which are rigidly supported relative to one another by means of suitable tie rods (not shown), as is the usual practice in flight instrument construction. A fixed opaque cover plate or mask 13 having a first circular opening 14 therein is supported immediately behind glass 11. Mounted on the glass at the center of the circular opening 14 is a representation of a plan view of a miniature airplane 15. This constitutes a fixed reference in both azimuth and elevation for the various indicator elements to be hereinafter described. The miniature aircraft reference is preferably located such that the intersection of its wing and fuselage lies at the center of the opening 14. Also, the wing spread of the miniature airplane is preferably such that the wing tips constitute a "one-half dot" deviation of the craft from the radio beam.

Supported within the circular opening 14 is a compass card 16 with the usual compass calibrations. As will become apparent as the description proceeds, this compass card may be considered to constitute a further mask in the instrument face since it does serve to obscure certain indicating elements under certain conditions of operation as will be described. Compass card 16 has a second circular opening 17. The face of the compass card 16 is preferably coplanar with the mask 13 and is supported in this manner by means of a rearwardly extending cylindrical portion 18 at the rearward end of which is fixed a large annular gear 19. The gear in turn is supported in the instrument housing in a conventional manner by means of suitable circumferentially spaced roller discs (not shown) which cooperate with a circumferential slot in gear 19.

Compass card 16 is continuously stabilized with respect to magnetic North. This is accomplished by means of a motor follow-up system mounted in the instrument and mechanically coupled to the compass card drive gear 19 through suitable shaft and gearing schematically illustrated in FIG. 3 by dashed line 25, the follow-up system being responsive to signals from a gyro stabilized magnetic compass, such as that shown and described in U.S. Patent 2,357,319. This motor follow-up system is schematically illustrated in FIG. 3 and constitutes a motor 20 energized from amplifier 21 whose input is an electrical signal proportional to the difference between the position of the compass card 16, as represented by synchro 22 mechanically connected to motor 20 through a gear train and coupling 25', and the magnetic heading of the craft, as represented by synchro 23, responsive to magnetic compass system 24. The compass heading of the craft is read preferably at the top of the instrument as defined by a fixed lubber line 26, FIG. 1. Also, since miniature aircraft reference 15 is also fixed, instantaneous aircraft heading may also be represented by a visual extension of the nose of the aircraft to the compass calibrations.

The circular opening 17 of the compass card defines a central area in the instrument face in which certain indicating elements of the instrument are viewed. The first of these elements is an elongated bar 30 that is mounted in the instrument for movement diametrically across the opening 17 and simultaneously rotates within the opening 17 about the center of the opening defined by the reference aircraft 15. As will become apparent as the description proceeds, the bar is diametrically displaced across the opening in accordance with the lateral departure of the aircraft with respect to a radio-defined flight path. The signal for operating the course bar 30 is provided from a conventional VOR receiver 38 on leads 39. A schematic disclosure of such a receiver is found in the above Reedy patent while a detailed disclosure may be found in Technical Development Report No. 113, issued June 1950 by the CAA, entitled "CAA VHF Omni-range." The course deviation bar 30 is simultaneously rotated about the center of the opening in accordance with the difference between the actual heading of the aircraft and the bearing of the selected radio beam. Thus, the bar 30 constitutes a heading stabilized course deviation indicator and provides the pilot with a plan picture of the azimuth attitude of the craft with respect to a radio track.

Figure 2:
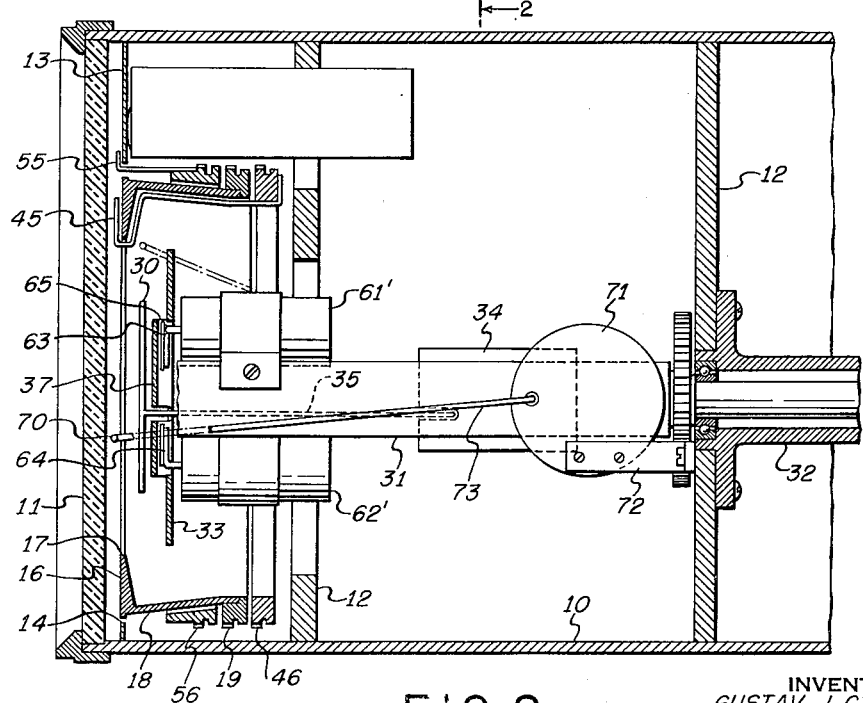
FIG. 2 is a partial vertical section of the instrument taken on line 2—2 of FIG. 1.

Referring to FIGS. 2 and 3, the support for bar 30 will now be described. Rotatably mounted in the instrument housing is a U-shaped gimbal member 31 which is mechanically supported by an elongated trunnion 32 extending between two of the walls 12 (only one of which has been illustrated in FIGS. 2 and 3). The forward ends of gimbal 31 support a further circular mask 33 which forms a background member for the bar 30. Mounted between the arms of the gimbal 31 is a meter movement 34 to which the bar 30 is attached by means of an elongated meter arm 35 extending through a suitable elongated opening or slot 36 in the mask 33. As shown schematically in FIG. 3, this meter movement is energized by the signal on lead 39 from receiver 38 which varies in accordance with the lateral deviation of the aircraft from a selected radio beam.

The mask 33 carries deviation "dots" which constitute a scale for indicating the magnitude of the deviation of the craft from the beam. Also, the mask 33 has a central portion 37 thereof which is raised and contoured to conform with the circular movement of the bar 30 about the meter movement pivot. This raised portion serves a dual function of reducing parallax between the bar 30 and the reference dots on the mask 33 and to provide an aperture through which the to-from flags (to be described) may be rendered visible.

The gimbal 31 is rotated in accordance with two inputs. These inputs are schematically illustrated in FIG. 3. One of the inputs is from the compass system 24 and the other is from a manually settable course selector knob 40. The input from the compass system is provided through gear 41 which meshes with a gear 42 at the rearward end of the gimbal 31. Gear 41 is driven through mechanical connection 42' from compass follow-up motor 20 through one input to a differential 43. The input from selector knob 40 is by way of mechanical connection 44, through the other input of differential 43 to connection 42' and gear 41. Thus, the azimuthal position of the course deviation bar 30 about the miniature aircraft 15 may be manually adjusted to any desired magnetic heading and thereafter it will be rotated with the compass card as the aircraft changes its magnetic heading. In order to insure an accurate setting of the gimbal 31 and hence the bar 30 with respect to the compass card 16, a course marker 45 is provided. This marker is moved simultaneously with the gimbal 31 through ring gear 46 through mechanical connection 47. Ring gear 46 is mounted adjacent the compass card ring gear 19 and supported in the same manner as ring gear 19. A further and even more accurate indication of the course selected by rotation of knob 40 is provided by means of a drum-type counter located in the upper left-hand corner of the instrument face (FIG. 1) and driven by a direct mechanical connection 48 from the course set knob 40. The counter also insures an accurate setting of course when the desired course lies near the bottom of the instrument.

As clearly disclosed in the above-mentioned Reedy patent, when the instrument of the present invention is used in flying a VOR radial, the course selector knob 40 simultaneously positions a course resolver 49 which serves simultaneously to set the VOR receiver 38 through leads 26 and 27 to provide left-right deviation information from a radio-defined radial corresponding to the set compass heading. Also, driven directly from mechanical connection 42 is a course error control transformer 50 for supplying to other instruments, such as flight director and/or autopilot, a signal corresponding to the course error, i.e., it constitutes a remote course selector for the flight director and/or autopilot. The detailed operation of the azimuth stabilized course deviation indicator portion of the present instrument described hereinabove is clearly set forth in the above-described Reedy patent and therefore will not be repeated here.

Very briefly, the operation is as follows. When flying a VOR navigation system, the pilot rotates the course selector knob 40 until marker 45 lies adjacent the magnetic heading corresponding to the magnetic heading of the desired VOR radial. In so doing, he positions the gimbal 31 and hence meter movement 34 and bar 30 to the same angular orientation. If the aircraft lies to the right of the radial so selected and is flying a path substantially parallel thereto, the appearance of the instrument will be that illustrated in FIG. 1. In order to cause the craft to approach and maintain the selected radial, the pilot turns to the left. As the aircraft changes heading, both compass card 16 and bar 30 will rotate clockwise, the bar 30 still being displaced from the center of the instrument but now lying diagonally above and to the left of the miniature airplane 15. As the craft approaches the beam, the bar 30 will approach the center of the instrument. The approach is continued by the pilot now changing heading in a counter-clockwise direction which again simultaneously rotates gimbal 31 so as to bring the bar 30 in alignment with the fore and aft axis of the miniature airplane 15 as the deviation approaches zero. Proper control of the aircraft in accordance with the movement of the bar with respect to the miniature aircraft will result in an asymptotic approach to and maintenance of the selected VOR radial.

Operation when flying a localizer beam of an ILS is substantially identical. The magnetic bearing of the localizer beam is similarly set in by the course knob 40.

Due to the character of the VOR radio system and its receiver on the aircraft, information is provided which informs the pilot whether he is flying toward or away from the VOR station. The manner in which this "To-From"-signal is generated in the radio receiver 38 is described in detail in the above-mentioned CAA report and need not be repeated here. It may simply be stated that when a pilot selects a VOR radial, he simultaneously selects the radial displaced 90° therefrom which therefore provides a signal in one sense when the aircraft is approaching this 90° radial and in the opposite sense when the aircraft passes such radial. This reversing signal is converted to a reversible polarity D.C. voltage which appears on lead 60 in FIG. 3. The To-From indication is provided by two triangular elements 61 and 62 (FIG. 1). These triangular elements or arrowheads are actuated by meter movements 61', 62', respectively, which in turn are secured by means of suitable brackets to gimbal 31 and hence rotate therewith and are connected with the arrowheads 61, 62 by means of L-shaped arms 63 and 64 (FIG. 1). The meter movements are located at the forward end of the gimbal 31 and the arms 63 and 64 extend into the space 65 (FIGS. 2 and 3) left by the curved-out portion 37 of mask 33. The arrowheads 61 and 62 mounted on these arms are caused to move through the slots defined by raised mask portion 37 to positions in back or in front thereof to thereby be rendered visible or invisible to the pilot. Also, suitable stops (see FIG. 1) are provided for limiting the movement of the arms 63 and 64 to the positions illustrated when current through the meter movements flow in one direction or the other. Each of the meter movements 61', 62' are so spring biased that when no To-From signal is supplied, both arrowheads will be biased to their invisible positions. That is, they will both lie behind the raised portion 37 of mask 33. In FIG. 1, this is the condition illustrated. As shown schematically in FIG. 3, meter movements 61', 62' are connected in series with the D.C. signal appearing on lead 60. Thus, for example, if a positive signal is applied across the meter movements, one flag, say flag 61, will be caused to rotate to the position shown in dot-dash lines in FIG. 1 while flag 62 will remain where it is, its meter movement 62' tending to drive the arm 64 harder against its stop. The action is, of course, reversed when the To-From signal reverses polarity.

In accordance with a feature of the present invention, the arrowheads 61 and 62, together with their meter movements 61' and 62', are so relatively arranged on the gimbal 31 that when one or the other of the arrowheads is visible, it lies closely adjacent the inner periphery of the circular opening 17 in the compass card 16. Therefore, when the aircraft is squarely on the beam and the pointer 30 is lined up directly with the miniature airplane 15, the indicator element 61 or 62 will form an arrowhead for the bar 30, and hence an entire arrow having shaft and head, pointing in the direction of the selected VOR station. Since the to-from arrowheads lie closely adjacent the inner periphery of the compass card opening 17, it is obviously desirable that there be no indicating element within the opening which will, under any heading condition obscure the arrowheads.

It should be pointed out that no to-from information is provided during an instrument approach to an airport on an ILS system, and no to-from signal will be applied to lead 60 and both arrowheads 61 and 62 will be spring biased to positions behind the raised portion 37 of mask 33. Therefore, in VOR operation, the opening 17 should be kept free of any indicating element which would interfere with the to-from arrowheads, as will become evident below.

As an added convenience, the instrument is also provided with a heading selector knob 51 which, through mechanical connection 52, differential 53 and connection 54 (FIG. 3), drives a heading selector index 55 (FIGS. 1 and 2) through a ring gear 56 to which the index is attached. Ring gear 56 is mounted in the instrument in the same manner as ring gears 19 and 46. Heading selector knob 51 rotates heading error control transmitter 57 which may be used as a remote heading selector for a flight director and/or autopilot. After having been set to the desired magnetic heading, marker 55 is thereafter driven with the compass card 16 through mechanical connection 58 from compass follow-up motor 20.

As a still further convenience, the instrument may be provided with a miles-to-destination counter operated in accordance with the DME signals, the counter being located in the upper right-hand corner of the instrument face (FIG. 1).

The instrument of the present invention also includes indicator means for aiding the pilot in approaching and maintaining the glide slope beam of an ILS. Referring to FIG. 1, this indication is provided by a second bar 70 which is mounted in the instrument to move diametrically across opening 17 in the instrument face. However, the bar always remains horizontal and may be suitably colored or marked to distinguish it from the course deviation bar 30. Glide slope bar 70 is actuated by means of a meter movement 71 fixedly mounted in the instrument housing, as by means of brackets 72, on one of the walls 12 and is coupled with bar 70 by means of an elongated connecting member 73. Of course, the bar 70 and member 73 may be made in one piece as shown in FIG. 3. The glide slope bar 70 is normally spring-centered, that is, the meter movement spring causes the bar 70 to lie in its zero position when there is no energization of meter movement. This zero position is such that the bar 70 lies centered in the opening 17, i.e., directly under the wings of miniature airplane 15. Meter movement 71 is energized from the output of a glide slope receiver 75 of conventional construction through lead 76 as schematically illustrated in FIG. 3.

It will be noted that there are no displacement "dots" on the mask 33 against which the glide slope bar 70 may be read. The reason for this is that the instrument is used more for enroute navigation and initial ILS approach than it is during let-down on final approach. However, it is still desirable to provide some form of scale under the latter conditions against which the glide slope bar may be read so that the pilot will have some idea of the absolute magnitude of his displacement from glide slope beam. The instrument of the present invention provides a scale 77 for this purpose. In accordance with the objects of the present invention, this scale is moved out of the way under all flight conditions other than the final glide slope approach thereby rendering the central opening 17 of the instrument uncluttered with unnecessary indicating elements and insuring that the arrowheads 61 or 62 will always be visible during VOR operation no matter what the heading of the craft may be.

To further remove unnecessary indicating elements from the opening 17 when they are not being used, means have been provided for moving the glide slope bar 70 from view during VOR operation. This means is shown schematically in FIG. 3. Frequency selector knob 78 of receiver 38 controls a switch 79 which in turn controls the energization of relay 80, energization of which controls suitable switching 81 to supply glide slope bar meter movement 71 with a bias potential which in turn moves the glide slope bar 70 upwardly and behind the compass card 16 which, in this case, obviously serves as a mask for obscuring the glide slope bar. This bias is supplied from a suitable source of D.C. voltage 82. Thus, whenever the frequency selector knob 78 is rotated for a VOR frequency, switch 79 is closed thereby supplying D.C. voltage to relay 80 and simultaneously, upon actuation of the relay, to meter movement 71. On the other hand, whenever selector knob 78 is tuned to an ILS frequency, switch 79 is opened, relay 80 de-energized, and the meter movement 71 is connected to the output of glide slope receiver 75.

Glide slope scale 77 comprises a substantially flat member 85 suitably secured to the arm 86 of an actuating meter movement 87. Meter movement 87 is suitably fixedly mounted in the housing, as on one of the walls 12. The meter movement is energized by the glide slope receiver warning flag signal appearing on lead 88. This flag signal is a conventional output of a standard glide slope receiver, such output serving to indicate when sufficient signal strength is being received for the pilot to rely on movements of the glide slope deviation indicator.

Glide slope reference means or scale 77 is provided with a straight edge 89 and is mounted in the instrument housing such that this straight edge is vertically disposed in the opening 17 and is therefore parallel with movement of the glide slope bar 70 upwardly and downwardly across said opening. Futhermore, when in its actuated position as shown in FIG. 1, this straight edge lies closely adjacent glide slope bar 70. The reference means 77 is provided with suitable graduations 90 for indicating to the pilot the magnitude of the craft displacement of the glide slope beam.

Fixedly mounted in the instrument directly behind the reference scale 77 when in its actuated position is flag element 91 which may be of a bright color and which may be provided with suitable letters, such as GS. Thus, when the scale 77 is not visible, warning flag 91 is visible thereby indicating to the pilot that he is not receiving proper glide slope signals.

The operation of the instrument when using a glide slope beam may best be described by considering an aircraft which is substantially on the localizer beam but which has not as yet entered the glide slope beam. Under this condition, the glide slope receiver is functioning (since it is turned on through suitable interlocking switch connection 92 associated with the ILS frequency selector switch 78), but no usable signal is being received. Therefore, there is no output on lead 76 and the glide slope pointer 70 lies in its centered or zero position. Likewise, there is no flag signal on lead 88 and the glide slope scale 77 lies behind the compass card 16. As the aircraft approaches the glide slope beam (usually from the underside), a "fly-up" glide slope signal will begin to be received and supplied to the meter movement 71. This signal may cause glide slope bar 70 to move slightly from its center position. However, the signal is still not strong enough to be relied upon and there is therefore no flag signal from the receiver. The glide slope reference scale 77 will remain behind the compass card 16, leaving glide slope warning flag 91 exposed and thereby telling the pilot to ignore any movement of the glide slope pointer 70. As the aircraft moves into the glide slope beam, and the received signal becomes stronger and stronger, the bar 70 will continue to rise and the reference scale 77 will gradually move to the right and finally cover warning flag 91 indicating to the pilot that he may now rely on the glide slope bar deviation and make whatever corrections in his flight path he deems necessary.

While the invention has been described in its preferred embodiment, it is to be understood that the words which have been used are words of description rather than limitation and that changes within the purview of the appended claims may be made without departing from the true scope and spirit of the invention in its broader aspects.

What is claimed is:

1. In an aircraft navigation indicator for indicating to the pilot the position of the craft with respect to a radio-defined flight path and including radio receiver means for supplying an output in accordance with the departure of said craft with respect to said flight path, pointer means displaceable across the face of said indicator in accordance with departures of said aircraft from said flight path, reference means mounted in said instrument for movement from one position in said instrument invisible to the pilot to another position therein visible to the pilot and adjacent said pointer whereby when in said other position to provide a visible reference for said pointer, and means responsive to the magnitude of the output of said receiver for moving said reference means from one position to the other.

2. The apparatus as set forth in claim 1 further including warning means so positioned in said instrument face that it will be rendered visible when the scale is in said invisible position.

3. In an aircraft navigation indicator for indicating to the pilot the position of the aircraft with respect to a radio-defined flight path and including a radio receiver means for supplying an output in accordance with the departure of said craft with respect to said flight path, said instrument having a window therein through which indicating elements of said indicator may be viewed, a mask within said window for defining an opening in said window, pointer means displaceable across said opening in accordance with departures of said aircraft from said flight path, reference means mounted in said instrument for movement from one position behind said mask to another position within said opening and adjacent said pointer whereby when in the said other position to provide a reference for said pointer, and means responsive to the magnitude of the output of said receiver for moving said reference means from said one position to the other.

4. In an aircraft navigation indicator for indicating to the pilot the position of the craft with respect to a radio-defined flight path and including radio receiver means for supplying an output in accordance with the displacement of said craft with respect to said flight path, said instrument having a circular viewing opening, a pointer element positionable in said instrument face for movement diametrically across said circular opening, a member having a straight edge and a reference scale along said straight edge, said member being supported in said instrument such that said straight edge is parallel to the direction of movement of said pointer, means for moving said scale member from a position external of the periphery of said opening to a position within the periphery of said radio receiver means is rendered effective, reference scale for said pointer, and means responsive to the magnitude of the output of said radio receiver for moving said scale from one position to the other.

5. In an aircraft navigation indicator for indicating to the pilot the position of the craft with respect to a radio-defined flight path and including radio receiver means for supplying an output in accordance with the departure of said craft with respect to said flight path, pointer means displaceable across the face of said indicator in accordance with said output, means for rendering said pointer means invisible to said pilot when said radio receiver means is rendered noneffective, means for moving said pointer means to a position visible to said pilot when said radio receiver means is rendered effective, reference means mounted in said instrument for movement from one position in said instrument invisible to the pilot to another position therein visible to the pilot and adjacent said pointer whereby when in said other position to provide a reference for said pointer, and means responsive to the magnitude of the output of said receiver for moving said reference means from one position to the other.

6. A radio navigation indicator for aircraft having first and second radio receiver means for suplying first and second outputs respectively proportional to deviations of said craft from radio beams defining a flight path, comprising an instrument housing having a window therein and a mask within said window having a substantially circular opening through which the indicating elements of said indicator may be viewed, a first indicating element positionable in said opening for movement diametrically thereacross in accordance with said first output, a second indicating element positionable in said opening for movement diametrically across said opening in accordance with said second output, means for rendering said second element invisible to said pilot when said second radio means is rendered non-effective, means for moving said second element to a position visible to said pilot when said second radio means is rendered effective, a member having a straight edge and a reference scale delineated along said straight edge, said member being supported in said instrument such that said straight edge is parallel to the direction of movement of said second element, means for moving said scale member from a position behind said mask to another position within said opening and adjacent said second element whereby to provide a straight edge reference scale therefor, and means responsive to the magnitude of the output of said second radio means for moving said scale from one position to the other.

7. In an aircraft navigation indicating instrument for indicating to the pilot the position of the craft with respect to first and second radio transmitters which define azimuth and elevation flight paths respectively for said aircraft and including first and second radio receiver means, said first receiver supplying a first output in accordance with lateral deviations of said craft with respect to said azimuth flight path and a second output in accordance with the direction of the position of said craft with respect to said first transmitter parallel to said azimuth flight path and said second receiver supplying an output in accordance with vertical deviations of said craft with respect to said flight path, the combination comprising an indicator housing having a substantially circular viewing opening therein, means defining at least a part of a diametral line across said opening, a first elongated bar supported in said instrument with its length parallel to said diametral line and laterally displaceable relative thereto in accordance with said first output, means for rotating said line in said opening in accordance with the difference between the heading of said craft and the bearing of said azimuth flight path, arrowhead defining means and means for mounting said arrowhead defining means in said instrument for movement from a position invisible to the pilot to a visible position adjacent the periphery of said opening and at one end or the other of said diametral line whereby when said craft is on said azimuth flight path said bar and arrowhead form an arrow pointing in one direction or the other with respect to said first transmitter, means for actuating said arrowhead defining means in accordance with said second output, a second bar displaceable diametrically across said opening in accordance with the output of said second receiver, reference means for said bar having a straight edge and a reference scale therealong, means for movably supporting said member in said instrument such that said straight edge is parallel to the direction of movement of said pointer, actuating means for said member for moving said member from a position within the periphery of said circular opening to an invisible position external of the periphery of said opening when said magnitude drops below a predetermined value whereby said scale does not obscure said pointer arrowhead when said second radio receiver cannot be used.

8. In an aircraft flight indicating instrument having a window therein, a mask in said window defining a circular opening through which indicating elements of the instrument may be viewed, an indicating element mounted in said instrument for movement across said circular opening, a reference member for said element having a straight edge, means for supporting said member in said instrument such that said straight edge is parallel to the direction of movement of said element, and means for moving said member from a position external of the periphery of said opening to a position within the periphery of said opening whereby said member provides a straight edge reference for said element in said circular opening when in said latter position.

No references cited.